(12) United States Patent
Chen et al.

(10) Patent No.: US 10,736,464 B2
(45) Date of Patent: Aug. 11, 2020

(54) SYSTEM AND METHOD FOR OPERATING A FOOD PREPARATION DEVICE

(71) Applicant: Serenete Corporation, Lawrenceville, GA (US)

(72) Inventors: Haidee Chen, Lawrenceville, GA (US); Helen Chen, Lawrenceville, GA (US)

(73) Assignee: Serenete Corporation, Lawrenceville, GA (US)

( * ) Notice: Subject to any disclaimer, the term of this patent is extended or adjusted under 35 U.S.C. 154(b) by 0 days.

(21) Appl. No.: 14/171,539

(22) Filed: Feb. 3, 2014

(65) Prior Publication Data

US 2015/0216362 A1 Aug. 6, 2015

(51) Int. Cl.
*A47J 44/00* (2006.01)
*A47J 43/04* (2006.01)
(Continued)

(52) U.S. Cl.
CPC ............... *A47J 43/04* (2013.01); *A23L 5/10* (2016.08); *A47J 27/00* (2013.01); *A47J 36/321* (2018.08); *A23L 5/15* (2016.08); *A47J 27/004* (2013.01); *A47J 27/0802* (2013.01); *A47J 27/086* (2013.01); *A47J 36/00* (2013.01); *A47J 36/165* (2013.01); *A47J 37/00* (2013.01)

(58) Field of Classification Search
CPC .. A47J 44/00; A47J 44/02; A47J 27/13; A47J 37/00; A47J 37/10; A47J 43/04; A47J 36/32; A47J 27/00; A47J 27/002; A47J 27/004; A47J 27/02; A47J 27/022; A47J 27/12; A47J 27/122; A47J 27/14; A47J 36/321; A47J 43/044; A47J 43/04454; A47J 43/04463; A47J 43/04472; A47J 43/04481; A47J 43/0449; A47J 27/044; A47J 2043/04472; A47J 2043/04481;
(Continued)

(56) References Cited

U.S. PATENT DOCUMENTS

| 3,127,067 A | 3/1964 | Hall |
| 3,244,328 A | 4/1966 | Brown |

(Continued)

FOREIGN PATENT DOCUMENTS

| CN | 86205953 U | 6/1987 |
| CN | 2032584 U | 2/1989 |

(Continued)

OTHER PUBLICATIONS

Omelette NPL, published Jun. 24, 2013, https://web.archive.org/web/20130624004517/http://www.eggs.ca:80/recipes/basic-omelette.*

(Continued)

*Primary Examiner* — Bryan Kim
(74) *Attorney, Agent, or Firm* — Mahamedi IP Law LLP

(57) ABSTRACT

A food preparation device or system which utilizes pre-packaged food containers to prepare a food item for consumption. The food preparation device is structured to receive multiple pre-packaged containers. Additionally, the food preparation device includes one or more processors to verify that each of the multiple containers include one or more ingredients for preparing a selected dish, and further that an order in which the multiple containers are individually received in the base corresponds to a sequence in which the individual food items of the multiple containers are to be introduced into a cooking receptacle during preparation of the dish.

6 Claims, 10 Drawing Sheets

(51) Int. Cl.
*A47J 36/32* (2006.01)
*A23L 5/10* (2016.01)
*A47J 27/00* (2006.01)
A47J 36/16 (2006.01)
A47J 36/00 (2006.01)
A47J 37/00 (2006.01)
A47J 27/08 (2006.01)
A47J 27/086 (2006.01)

(58) Field of Classification Search
CPC ...... A47J 2043/0449; A23L 1/00; A23L 1/01; A23L 5/00; A23L 5/15; A23L 5/17; A23L 5/10–5/13
USPC ....... 426/231, 232, 233, 234, 389, 394, 509, 426/520, 523; 99/326, 327, 334
See application file for complete search history.

(56) References Cited

U.S. PATENT DOCUMENTS

| | | | |
|---|---|---|---|
| 3,357,598 A | 12/1967 | Kraft | |
| 4,005,668 A | 2/1977 | Washington | |
| 4,503,502 A * | 3/1985 | Chapin | A47J 27/14 700/90 |
| 4,649,810 A * | 3/1987 | Wong | A47J 27/14 222/501 |
| 4,919,950 A | 4/1990 | Mak | |
| 4,944,218 A * | 7/1990 | Cresson | G07F 9/105 99/357 |
| 5,029,520 A * | 7/1991 | Okada | A47J 37/1228 221/150 HC |
| 5,132,914 A | 7/1992 | Cahlander | |
| 5,244,019 A | 9/1993 | Derby | |
| 5,386,762 A | 2/1995 | Gokey | |
| 3,237,804 A | 3/1996 | Bardy | |
| 5,522,309 A | 6/1996 | Mizobuchi | |
| 6,539,841 B1 * | 4/2003 | Spasovski | A47J 27/004 426/115 |
| 6,647,864 B1 * | 11/2003 | Fang | A47J 27/14 99/327 |
| 6,789,067 B1 * | 9/2004 | Liebenow | G06Q 10/087 705/15 |
| 6,843,166 B1 * | 1/2005 | Li | A47J 27/14 99/327 |
| 7,174,830 B1 | 2/2007 | Dong | |
| 7,665,398 B2 | 2/2010 | Gerber | |
| 7,673,775 B2 | 3/2010 | Penciu | |
| 7,789,111 B2 | 9/2010 | Luehrsen | |
| 8,710,408 B2 * | 4/2014 | Khatchadourian | A21D 8/02 219/388 |
| 8,813,635 B2 | 8/2014 | Dragn | |
| 8,820,219 B2 | 9/2014 | Buehler | |
| 8,835,816 B2 * | 9/2014 | McIntyre | G06Q 50/12 219/412 |
| 9,022,081 B2 | 5/2015 | Armonstrong | |
| 9,361,746 B2 | 6/2016 | Otzen | |
| 9,364,106 B1 | 6/2016 | Ortiz | |
| 9,445,614 B2 | 9/2016 | Storek | |
| 10,064,521 B1 * | 9/2018 | Gawali | B65D 83/00 |
| 2002/0083842 A1 | 7/2002 | Kown | |
| 2004/0006949 A1 | 1/2004 | Danby | |
| 2004/0011006 A1 | 1/2004 | Sus et al. | |
| 2004/0173103 A1 * | 9/2004 | Won | A47J 27/62 99/326 |
| 2004/0238555 A1 * | 12/2004 | Parks | G07F 9/105 221/80 |
| 2005/0166548 A1 | 8/2005 | Lavi | |
| 2005/0193901 A1 * | 9/2005 | Buehler | A47J 44/00 99/468 |
| 2007/0254080 A1 * | 11/2007 | Schackmuth | G06Q 10/06 426/523 |
| 2008/0099462 A1 | 5/2008 | Wang | |
| 2008/0124434 A1 * | 5/2008 | Hrudka | G06Q 10/087 426/233 |
| 2008/0178749 A1 * | 7/2008 | Stutman | G06Q 10/06 99/494 |
| 2009/0212044 A1 * | 8/2009 | Stanton | A47J 36/321 219/682 |
| 2010/0116845 A1 | 5/2010 | Penciu | |
| 2010/0175352 A1 | 7/2010 | Soloman | |
| 2010/0196561 A1 * | 8/2010 | Kling | F24C 7/08 426/233 |
| 2010/0303972 A1 * | 12/2010 | Srivastava | A23L 1/01 426/233 |
| 2011/0151074 A1 | 6/2011 | Titen et al. | |
| 2011/0253482 A1 | 10/2011 | Purgatorio | |
| 2011/0300270 A1 | 12/2011 | Koppens | |
| 2012/0132642 A1 | 5/2012 | Broders et al. | |
| 2012/0156337 A1 * | 6/2012 | Studor | A47J 31/44 426/231 |
| 2012/0185086 A1 | 7/2012 | Khatchadourian | |
| 2013/0059024 A1 | 5/2013 | LeConte | |
| 2013/0133520 A1 | 5/2013 | Hulett | |
| 2013/0171304 A1 | 7/2013 | Huntley | |
| 2014/0230660 A1 * | 8/2014 | He | A47J 27/14 99/325 |
| 2014/0377417 A1 * | 12/2014 | Martinez | A47J 27/0802 426/231 |
| 2015/0088304 A1 * | 3/2015 | Ameye | A47J 31/404 700/233 |
| 2015/0107463 A1 * | 4/2015 | Lehman | A47J 39/006 99/443 C |
| 2015/0114236 A1 | 4/2015 | Roy | |
| 2015/0147441 A1 * | 5/2015 | Lagerlof | A47J 27/62 426/231 |
| 2015/0216363 A1 | 8/2015 | Chen et al. | |
| 2015/0238046 A1 * | 8/2015 | Xu | A47J 37/1228 99/334 |
| 2015/0290795 A1 | 10/2015 | Oleynik | |
| 2015/0320260 A1 * | 11/2015 | Takahashi | A47J 27/14 99/344 |
| 2016/0015219 A1 | 1/2016 | Rosalia et al. | |
| 2016/0150915 A1 * | 6/2016 | Yu | A47J 43/046 99/327 |
| 2016/0206132 A1 | 7/2016 | Chen et al. | |
| 2017/0150843 A1 | 6/2017 | Rosalia et al. | |
| 2018/0157232 A1 | 6/2018 | Chen | |
| 2018/0213976 A1 | 8/2018 | Chen et al. | |
| 2019/0231147 A1 | 8/2019 | Chen et al. | |

FOREIGN PATENT DOCUMENTS

| | | |
|---|---|---|
| CN | 2502864 Y | 7/2002 |
| CN | 102501242 A | 6/2012 |
| CN | 102717599 A | 10/2012 |
| CN | 202781874 U | 3/2013 |
| EP | 441397 A1 | 8/1991 |
| EP | 427358 B1 | 5/1995 |
| FR | 2743695 A1 | 7/1997 |
| TW | 201236568 | 9/2012 |
| WO | WO 92/17313 | 10/1992 |
| WO | WO 2008/083516 A1 | 7/2008 |
| WO | WO 2012-135917 | 10/2012 |
| WO | WO 2014/132559 A1 | 9/2014 |
| WO | WO 2015/117156 A1 | 8/2015 |
| WO | WO 2015/195985 A1 | 12/2015 |
| WO | WO 2015/195986 A1 | 12/2015 |
| WO | WO 2016/149686 A1 | 9/2016 |
| WO | WO 2017/192765 | 9/2017 |
| WO | WO 2018/089946 A1 | 5/2018 |

OTHER PUBLICATIONS

International Search Report and The Written Opinion of The International Searching Authority dated May 11, 2015, for related PCT Application No. PCT/US2015/014322 filed Feb. 3, 2015, 15 pages.
International Search Report and The Written Opinion of The International Searching Authority dated Aug. 28, 2015, for related PCT Application No. PCT/US2015/036534 filed Jun. 18, 2015, 17 pages.

(56) References Cited

OTHER PUBLICATIONS

International Search Report and The Written Opinion of The International Searching Authority dated Oct. 7, 2015, for related PCT Application No. PCT/US2015/036535 filed Jun. 18, 2015, 15 pages.
International Search Report and The Written Opinion of The International Searching Authority dated Aug. 11, 2016, for related PCT Application No. PCT/US2016/023310 filed Mar. 18, 2016, 7 pages.
Extended European Search Report dated Aug. 16, 2017, for related application No. 15742991.1, filed May 3, 2017, 7 pages.
Notification Concerning Transmittal of International Preliminary Report on Patentability dated Sep. 28, 2017, for related PCT Application No. PCT/US2016/023310 filed Mar. 18, 2016, 6 pages.
International Search Report and The Written Opinion of The International Searching Authority dated Aug. 24, 2017, for related PCT Application No. PCT/US2017/030911 filed Mar. 3, 2017, 6 pages.
Office Action dated Feb. 5, 2018, Application CN 2015800148726. 11 pages. Search report in English.
European Search Report dated Mar. 5, 2018, Application No. 15809674.3 13 pages.
International Preliminary Report on Patentability dated Nov. 15, 2018, for PCT Application No. PCT/US2017/030911, filed May 3, 2017; 5 pages.
First Examination Report dated Jun. 6, 2018, for related application No. 15742991.1, filed May 3, 2017, 5 pages.
Office Action dated Dec. 5, 2018, Application CN 2015800148726. 9 pages. Search report in English.
First Examination Report dated Jan. 3, 2019, for related application No. 2015210646, filed Jul. 27, 2016, 3 pages.
International Preliminary Report on Patentability dated May 23, 2019, for PCT Application No. PCT/US2017/061406, filed Nov. 13, 2018; 6 pages.
Office Action dated Jul. 3, 2019, Application CN 2015800148726, filed Sep. 19, 2016. 11 pages. Search report in English.
First Examination Report dated Jun. 4, 2019, for related application No. 15742991.1, filed May 3, 2017, 4 pages.
Extended European Search Report dated Dec. 18, 2019, Application No. 17793282.9, filed Nov. 30, 2018, 76 pages.
Supplementary European Search Report dated Jul. 17, 2018, Application No. 15809674.3 13 pages.
International Search Report and The Written Opinion of The International Searching Authority dated Feb. 21, 2018, for related PCT Application No. PCT/US17/61406 filed Feb. 18, 2016, 7 pages.

\* cited by examiner

SYSTEM AND METHOD FOR OPERATING A FOOD PREPARATION DEVICE

TECHNICAL FIELD

The disclosed embodiments relate generally to a food preparation device.

BACKGROUND

Currently, there exists dried foods that can be mixed with water (e.g., hot water) in order to transform the food item from a dehydrated state into a consumable state (e.g., hot noodle soup). In these products, the end user generally has limited choice other than to select the pre-packaged food item (e.g. Raman, oatmeal), add water and flavor packets. These prepackaged foods are typically laden with preservatives to keep it in a dry state without refrigeration. Typically these dishes also contain high amounts of sodium and other unnatural chemicals.

There also exists microwavable foods, such as frozen foods which can be heated and served.

Coffee machines also exist that provide containers of coffee items (e.g., type of coffee, flavored coffee, mocha etc.). The containers can be placed into a machine that is pre-loaded with water. The machine then brews the coffee using the container.

Figures 1A, 1B:
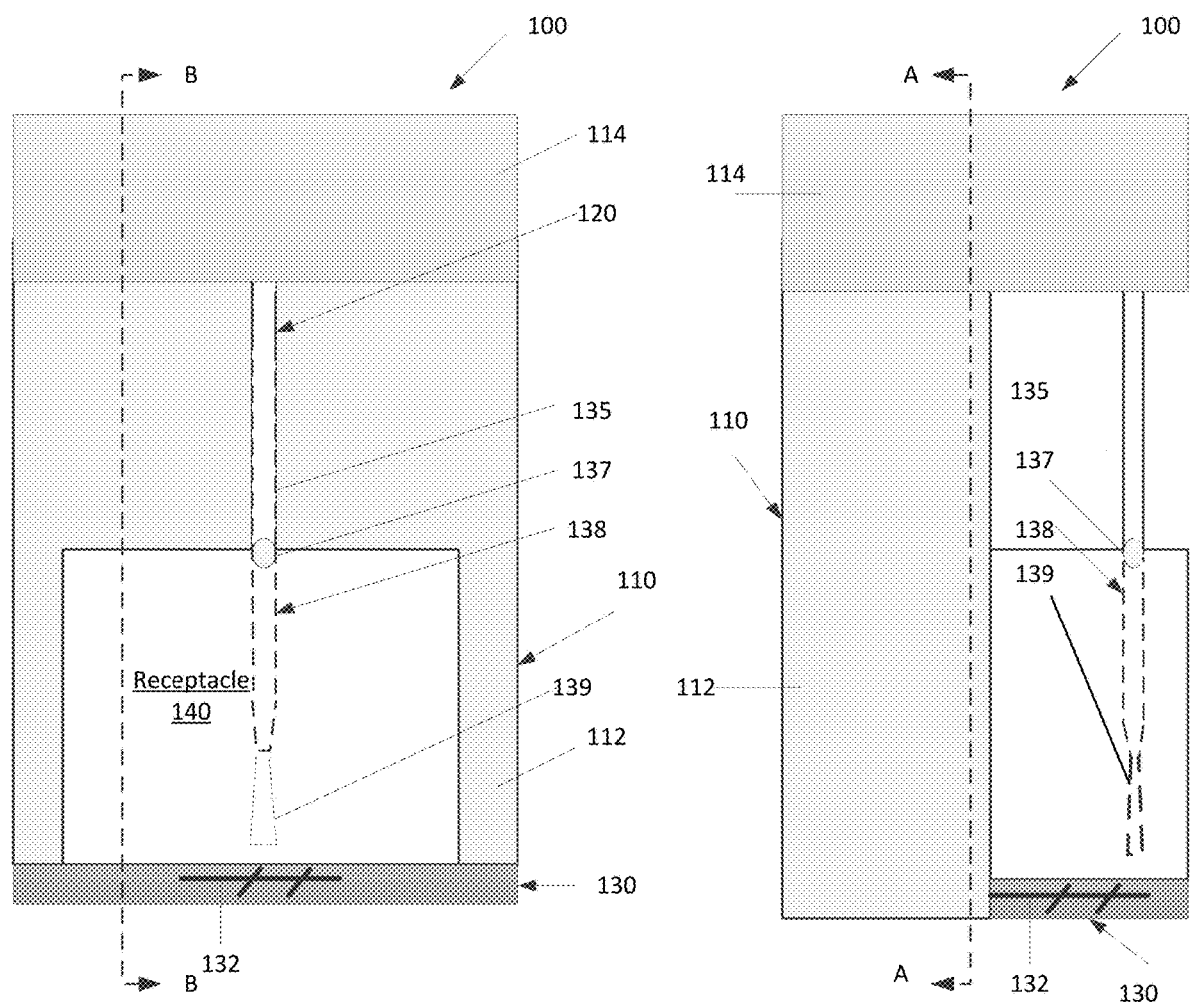
FIG. 1A illustrates a front view of a food preparation device, according to an embodiment.
FIG. 1B illustrates a side view of the food preparation device.

These and other embodiments are described in greater detail below.

DETAILED DESCRIPTION

Embodiments described herein include a food preparation device or system which utilizes pre-packaged food containers to prepare a food item for consumption. The food preparation device can utilize multiple food containers in combining different ingredients (condiments, liquid, solid, and gas) into a meal or dish. In particular, the food preparation device can cook (or heat/cool), mix, manipulate and transform ingredients provided from food containers into a final consumable state.

In one aspect, the food preparation device can implement recipes that identify ingredients from food containers. For example, the food preparation device can download recipes from a network site, receive recipes from a user operating a computing device, or have a remotely located user conduct live telecooking through the internet by manual or automated means. The processes performed by the food preparation device can be determined based at least in part on the recipe in use.

Among other benefits, the food preparation device can use pre-packaged food containers and programmatically controlled mechanisms to automate many of the steps that would otherwise be needed to prepare a meal or dish. For example, an embodiment enables a user to cook a meal in accordance with a recipe by (i) downloading a recipe onto the device, and (ii) inserting food containers that correspond with specific associated ingredients for the recipe. Subsequent processes for introducing ingredients to a cooking dish, heating, flipping, cutting, injecting, pressing, and stirring can be performed programmatically and/or substantially automatically (e.g., performed with little or no user action, such as the user pushing a button to perform a task/multiple tasks such as pouring or heating).

In an embodiment, a food preparation device includes a housing, an extraction mechanism, a receptacle, an ingredient-manipulator arm, a heating/cooling mechanism, and a processing resource. The housing includes an opening 115 that is dimensioned to receive a food container of a predetermined dimension. The extraction mechanism is provided with the opening 115 to extract a food item from each of the one or more containers. The preparation receptacle receives the food item extracted from each of the one or more containers. The heating/cooling mechanism heats/cools the receptacle when the food items are received. The processing resource identifies a recipe, and determines a set of food containers that include food items specified in the recipe. The processing resource can also verify that the set of food containers are correctly positioned in order at the opening 115 of the housing. The processing resource can also control the extraction mechanism in extracting food items specified in the recipe from each container in the set of food containers. Additionally, the processing resource can control heating/cooling mechanism in heating/cooling the preparation receptacle with the specified food items from the recipe.

One or more embodiments described herein can provide for methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines. A programmatic module can also be initiated or executed remotely via the internet (telecooking).

Furthermore, one or more embodiments described herein may be implemented through instructions that are executable by one or more processors. These instructions may be carried on a computer-readable medium.

Food Preparation Device

FIG. 1A and FIG. 1B illustrate a food preparation device, according to some embodiments. More specifically, a food preparation device 100 is able to perform, and thus automate many of the steps needed to prepare a food item, such as a meal, a dish, or cooked food item. Furthermore, in providing a prepared food item, the device 100 can cook, mix and manipulate/transform ingredients. Among other advantages, the device 100 enables users to prepare meals or dishes with minimal user interaction. In this way, the device 100 provides convenience to users, and further enables those individuals who are unable to cook (e.g., elderly, handicapped) to prepare meals with consideration for ingredients and recipes.

As described by examples provided below, the system 100 can be implemented to prepare a meal or dish using pre-packaged food containers. By way of example, the food containers can retain food items, which can form the ingredients of a prepared meal or dish. Depending on implementation, the food items retained in the food containers can be raw, partially cooked, or cooked. The device 100 enables individuals to use multiple pre-packaged food containers in order to cook and transform ingredients provided through the food containers.

FIG. 1A and FIG. 1B represent an exterior front and side view of device 100 respectively, according to an embodiment. The device 100 includes a housing 110 having a base 112 and a top segment 114. A bottom plate 130 can extend from the base 112. A food receptacle 140 can be positioned on the bottom plate 130. A manipulator 138 can extend from the top segment 114 into the receptacle.

The base 112 is dimensioned to retain pre-packaged food containers. In particular, the pre-packaged food containers can be dimensioned and structured to be received within an opening 115 in the bottom interior of the base 112 (see FIG. 1C and FIG. 1D), or within an opening 115 in the top interior of the housing 114 (see FIGS. 1F and 1G). In one implementation shown by FIG. 1C through FIG. 1E, the top segment 114 can provide a mechanism to extract and dispose food items from the pre-packaged containers into the receptacle 140. In another implementation shown by FIGS. 1F and 1G, the top segment 114 provides a mechanism to lower the pre-packaged containers into the interior of the base 112. As an alternative or addition, the device 100 can specify or use opened food containers. For example, the device 100 can be provided with instructions for the user on how to open or use food containers 10 before use.

The bottom plate 130 can include a heater 132. The heater 132 can heat the receptacle and its contents to a temperature that is suitable for cooking. For example, the heater 132 can heat the cooking surface 144 (see FIG. 1I) of the receptacle 140 to a temperature that in a range between, for example, 200-450° F. Such temperatures can be sufficient to cook all types of food. Alternatively, the bottom plate 130 can heat the receptacle 140 to warming temperatures under 200° F. In one implementation, the heater 132 can have multiple coils that can individually control specific temperatures in different areas of the bottom plate 130. For example, when needing to cook vegetables and meat at different temperatures on the same receptacle 140, the temperatures of the left side of the bottom plate 130 can be controlled at 400 degrees Fahrenheit by the associated heating coils, while the right side can be controlled at 200 degrees Fahrenheit by its associated coils. Eventually, foods can be mixed by the manipulator 138 to make the final dish.

In a variation, the bottom plate 130 can also include a cooler (not shown). The cooler can serve to chill foods, either as part of the food preparation step or post preparation (e.g., preservation).

The manipulator 138 can be motorized to swivel, spin or otherwise move within the receptacle 140. An embodiment provides for the manipulator 138 to include a base segment 135, a joint 137, an extension 139, and an end segment 133.

Bottom Up Orientation

Figure 1C:
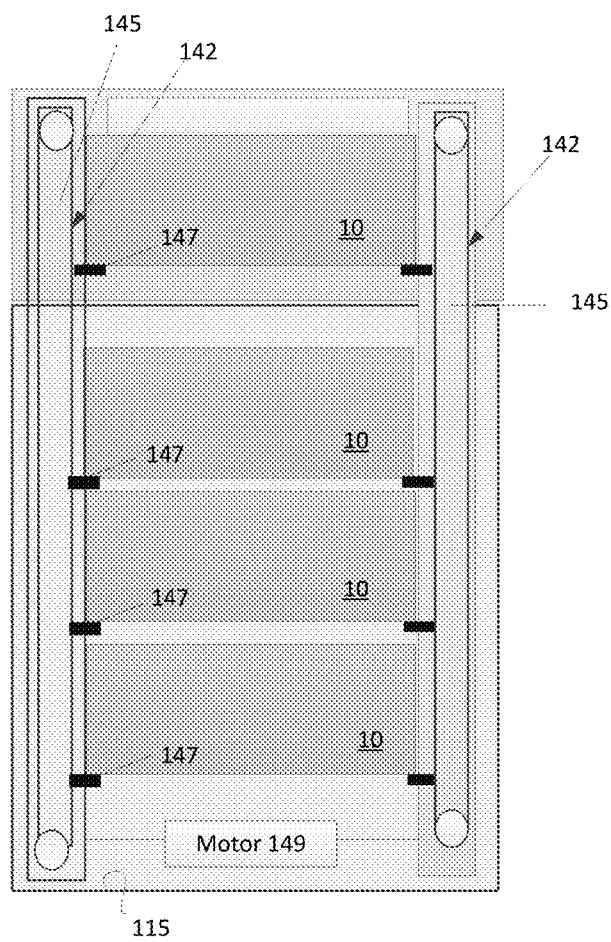
FIG. 1C illustrates a cross-section of the food preparation device along lines A-A of FIG. 1B, according to a top-down orientation, under an embodiment.
Figure 1D:
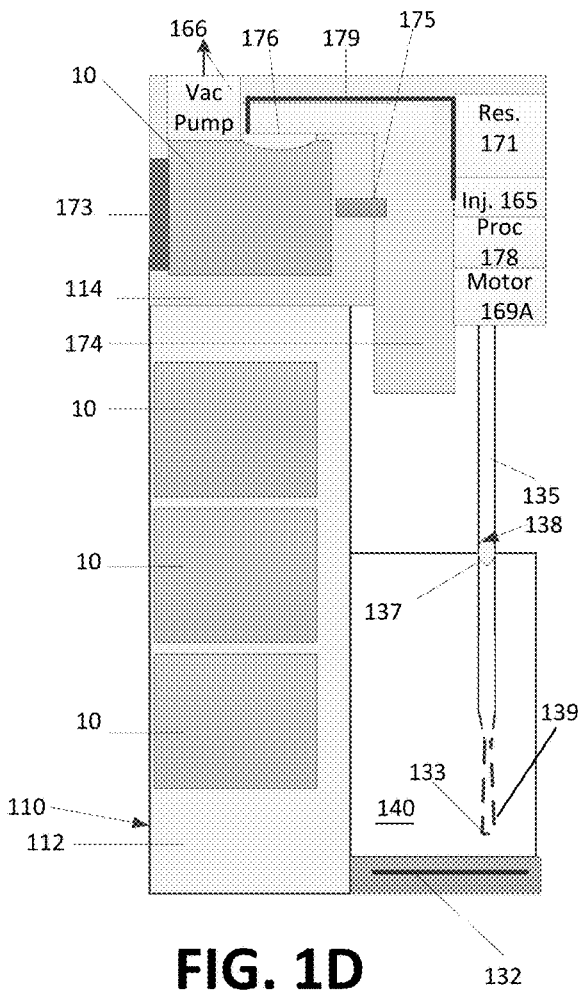
FIG. 1D illustrates a cross-section of the food preparation device along lines B-B of FIG. 1A, according to a top-down orientation, under an embodiment.
Figure 1E:
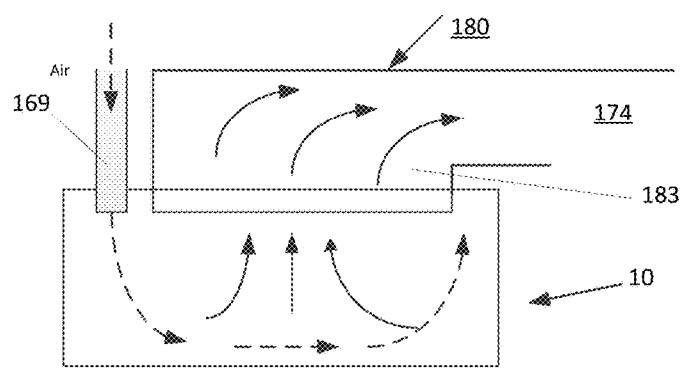
FIG. 1E illustrates the food extraction mechanism of FIG. 1A through FIG. 1D in more detail, according to an embodiment.

Examples described herein include multiple configurations in which food preparation device 100 receives food containers, extracts food items from the containers, distributes the food items into the receptacle 140, and further manipulates, heats and cooks the food items within receptacle. FIGS. 1C, 1D and 1E illustrate a bottom-up orientation in which a food receptacle is received via a bottom opening 115 and directed upwards to a point above the receptacle 140, at which point food extraction takes place and food items are extracted from the containers and dispersed into the receptacle 140.

In more detail, FIG. 1C illustrates a cross-section of device 100 along lines A-A of FIG. 1B. As shown, the base 112 includes the opening 115. In an example of FIG. 1C, multiple food containers 10 are retained. The containers 10 can be provided and combined according to a recipe to prepare a food item, such as a meal or dish. Accordingly, the containers 10 can correspond to ingredients of a meal or dish. In an example shown, the containers 10 are aligned vertically. In variations, the food containers 10 can be aligned horizontally. Still further, the containers 10 can be aligned circuitously. The device 100 includes mechanisms for individually introducing the food containers 10 into the receptacle 140 one at a time or more than one at a time.

Further, in an example of FIG. 1C, a movement mechanism moves the containers 10 upward to a point in the top segment 114 where food items within the container can be extracted and disposed into the receptacle 140. In one embodiment, the movement mechanism corresponds to a conveyer system, including a pair of opposing conveyers 142 that lift the individual containers 10 from the bottom, upwards towards the top segment 114, where extraction of the food item takes place. Each conveyer 142 can include a track member 145, with support structures 147 to support individual containers, while the support structures 147 are moved upward or downward by the conveyers 142. In this way, the plate structures 147 can move upward or downward with motion provided by the track member 145. The track member 145 can be equipped with a motor 149 in order to permit movement of the plate structure 147.

FIG. 1D illustrates a cross-section of device 100 along lines B-B of FIG. 1A. In the example shown, the base 112 is shown to house multiple food containers 10. The top segment 114 retains the container 10 that is being extracted. The food container 10 is pushed upward into the top segment 114. The conveyers 142 push the containers 10 upward to engage an extraction mechanism. The extraction mechanism can include a container interface 176, which interfaces with a surface of the food container 10 to open the container. By way of example, the container interface 176 can include a sharp or pointed structure that punctures the top surface of the container 10. The conveyer 142, or an additional motion mechanism can push the container 10 against the container interface 176 to cause the top surface of the container to partially open (e.g., puncture).

In one implementation, the top segment 114 includes an outlet 174 that receives food items extracted from the food container 10, and dispenses the food items into the receptacle 140. Additionally, in one implementation, the top segment 114 can include components for providing a food extraction mechanism. In the example provided, the food extraction mechanism includes a vacuum pump 166 and an injector 165. The vacuum pump 166 generates a vacuum through the outlet 174, so that food items are sucked from the container 10. The vacuum pump 166 can be extended into the container 10 through the container interface 176.

The injector 165 can pressurize and/or heat liquid or air. A conduit 179 can extend from the injector 165 to the container interface 176 in order to introduce the air/liquid into the container 10, and cause the food items to push out into the outlet 174. A reservoir 171 can be provided in order to receive liquids such as water, for extraction, mixing or introduction into the receptacle 140.

With further reference to FIG. 1D, a manipulator 138 can extend from the top segment 114 of the housing 110. The manipulator 138 is coupled to a motor 169A so that it is motorized to swivel, stir or move to mix food items dispensed in the receptacle 140. The manipulator 138 can include the joint 137, so that the extension 139 can pivot relative to the base segment 135.

FIG. 1D also illustrates a processor 178 for controlling mechanisms of the device 100. In some embodiments, the processor 178 can implement a system such as described with FIG. 3 or FIG. 4. Additionally, in some embodiments, the processor 178 can implement a process such as described with FIG. 5 or with FIG. 6.

With further reference to FIG. 1D, once the food item is dispensed from the container 10, the container 10 can be stacked together and removed using a door 173. The door 173 can be positioned in a rear or side façade of the housing 110. By way of example, the door 173 can be hinged to open outward. In one implementation, the ejection of the used container 10 is automatic, and in response to the food item being dispensed from the container 10. In such an implantation, an ejection mechanism 175, such as a motorized and/or spring-biased push rod, can be used to force the container 10 out of the housing via the door 173. In a variation, the container 10 can be manually removed by a user. As an alternative, an alert can be sounded or displayed to indicate when the user should remove the container 10 from the housing 110.

FIG. 1E illustrates the food extraction mechanism of FIG. 1A through FIG. 1D in more detail, according to an embodiment. A food extraction mechanism 180 includes (i) conduit 169 which provides air/liquid injection, which forces one of air or liquid into the container 10, and/or (ii) vacuum interface 183, which generates the vacuum to draw food items out through the outlet 174. The injector 165 (see FIG. 1D) can heat or pressurize air/liquid through the conduit 169 and into the container 10, and the vacuum pump 166 can generate the vacuum to draw the food items from the container 10.

Top Down Orientation

Figure 1F:
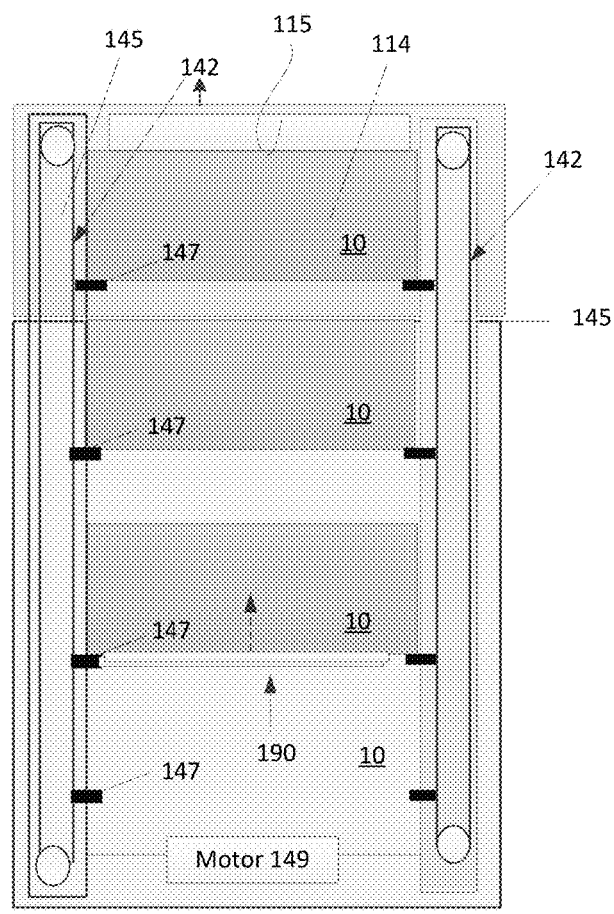
FIG. 1F illustrates a cross-section of the food preparation device along lines A-A of FIG. 1B, according to an up-down orientation, under an embodiment.
Figure 1G:
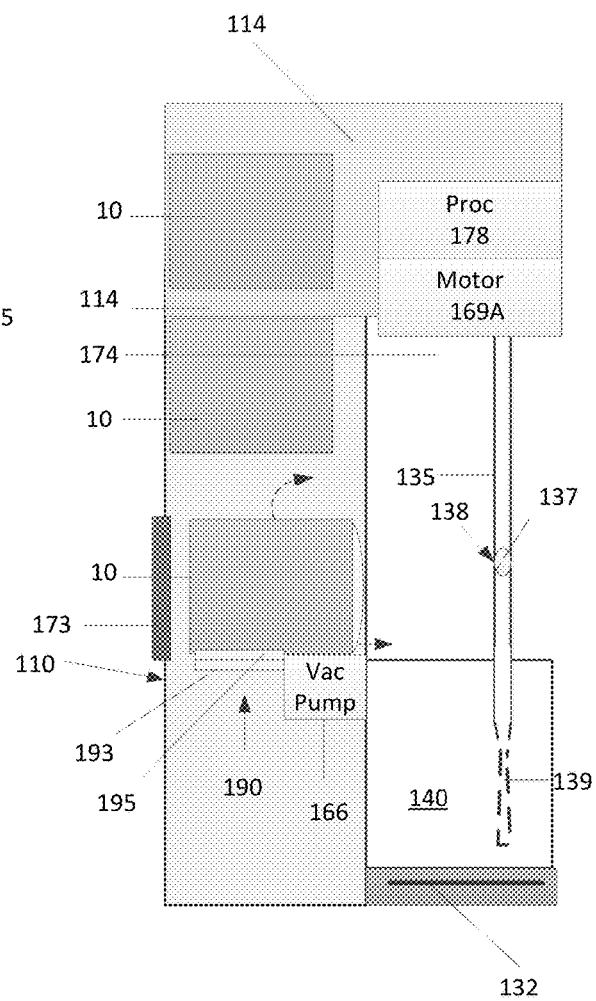
FIG. 1G illustrates a cross-section of the food preparation device along lines B-B of FIG. 1A, according to the up-down orientation, under an embodiment.

In variations, food preparation device 100 can include alternative configurations for the manner in which the food containers is positioned, moved and acted upon to distribute food items. In one implementation, FIG. 1F and FIG. 1G illustrate a top-down orientation, as a variation to an implementation of FIG. 1C and FIG. 1D. With reference to FIG. 1F, the opening 115 can be provided with the top segment 114. For example, the opening 115 can be provided as a top lid of the top segment 114. The conveyers 142 can operate to lower the individual containers from the top segment 114 downward to an extraction point that is in the middle or bottom end of the base 112.

With reference to FIG. 1F and FIG. 1G, the extraction mechanism can be implemented with container interface 176 engaged to unseal an edge or periphery. In FIG. 1G, for example, the container interface 176 can engage a vertical edge of the container 10, and the container 10 can be structured so that is unsealable from the corresponding edge. In one implementation, food container 10 can be pre-opened from one side. In a variation, a mechanism such as the container interface 176 can operate to eliminate one side of the food container while it is inside base 112. The vacuum pump 166 can be positioned to draw food items out of the container 10 from the unsealed edge of the container 10.

With further reference to FIG. 1F and FIG. 1G, a lift 190 can be provided as a base for the container 10 that is at the extraction point. The lift 190 can include, for example, an upper member 193 that can pivot upward from a horizontal base segment 195. This can cause the container 10 to tip forward. The tilting facilitates the extraction of food items from the container 10 at the extraction point. In order to enable the container 10 at the extraction point to tilt, the container 10 at extraction point may need additional clearance with respect to an adjacent container. The additional clearance can enable the lift 190 to tilt the container 10 by some measure or degree forward.

In one variation, the container 10 at the extraction point can also traverse outward over the receptacle 140. For example, the upper member 193 can slide outward over the receptacle 140, and further enable tilting and/or vacuum extraction.

Still further, the container 10 at the extraction point can be extended partially outward from the base 112 so that it is partially above the receptacle 140. The lift 190 can slide or otherwise move the container 10 at the extraction point outward over the receptacle. In a variation, another structure such as an ejection mechanism can push the container 10 outward. After the food container is extended over the receptacle 140 it can be rotated from 90-270 degrees in a swivel motion until the ingredients are emptied into the receptacle 140. This process can be repeated every time a new ingredient needs to be added to the receptacle 140.

Thus, examples such as shown by FIG. 1F and FIG. 1G illustrate alternative implementations for orienting containers, and implementing extraction of food items from such containers. While examples of FIG. 1C-1G illustrate variations in arranging in extracting containers in a top-down and bottom up orientation, other configurations can also be employed in accordance with embodiments described herein. For example, food items from the container 10 at the extraction point can be scooped out of the container by the jointed food manipulator and placed into the receptacle 140.

Still further, while described examples utilize vacuum and/or injection for extracting the food item from the container 10, variations can provide for use of other types of mechanisms. For example, in one implementation, the top segment 114 or base 112 can be provided with a scooper to scoop the food items from the containers 10. In still another variation, the top segment 114 or base 112 can include a tray that can flip 90 degrees or more in order to dump the food item out. In another variation, the jointed food manipulator 138 can serve as the scooper and scoop or push the food items from the containers 10.

Food Container

Figure 1H:
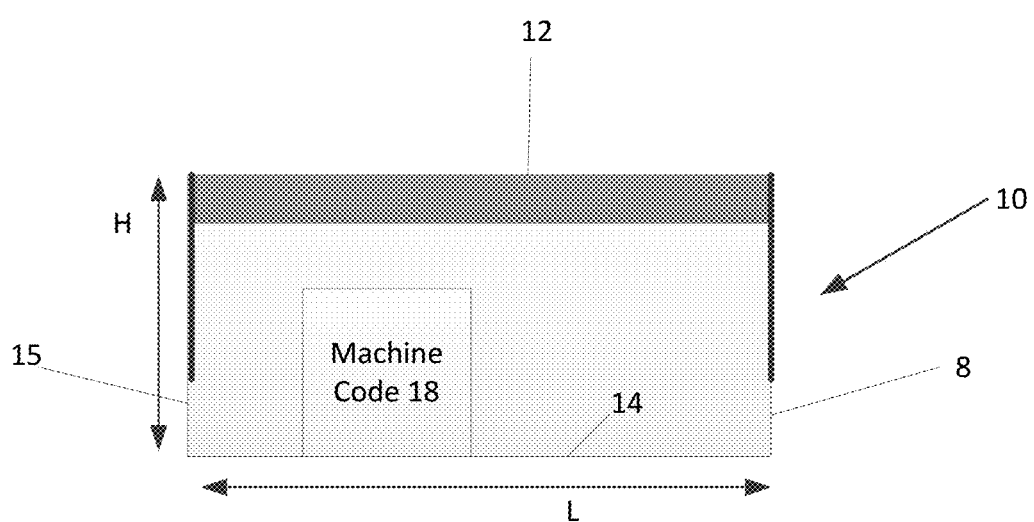
FIG. 1H illustrates an example of a food container for use with one or more examples.

FIG. 1H illustrates an example of a food container 10 for use with one or more examples. The food container 10 can retain food/ingredients in a raw state, partially-cooked state or fully-cooked state. The food item of an individual container 10 can correspond to an ingredient(s) that can be further cooked, manipulated and transformed with other ingredients (provided from other food containers 10). In FIG. 1F, container 10 includes a package 8 having a top surface 12, a bottom base 14 and sidewalls 15. The package 8 can include dimensions of length (L), height (H) or width (not shown). The dimensions of the package 8 can be selected so that the package 8 can fit into the opening 115 of the housing 110 of device 100 (see FIG. 1D). The container 10 may also have a perforated area for insertion of an edge or other tool provided through the container interface 176.

In one aspect, the package 8 includes a machine code identifier 18 provided on a sidewall 15. The machine code identifier 18 can provide one or more of the following: (i) an identifier of the container 10, (ii) identification about the contents of the food container 10, (iii) information about how the contents of the food container 10 are to be used (e.g., heat to certain temperature, etc.), (iv) date of expiration of the ingredients in the food container 10, (v) amount of ingredient in food container 10, and/or (vi) place where ingredients are sourced from and/or purchased from. In another aspect, the package 8 is equipped with a radio-frequency identifier (RFID) tag. A compatible RFID reader (not shown) on the device 100 can detect information (e.g. container identifier, food item contained) about the food container 10.

Figure 1I:
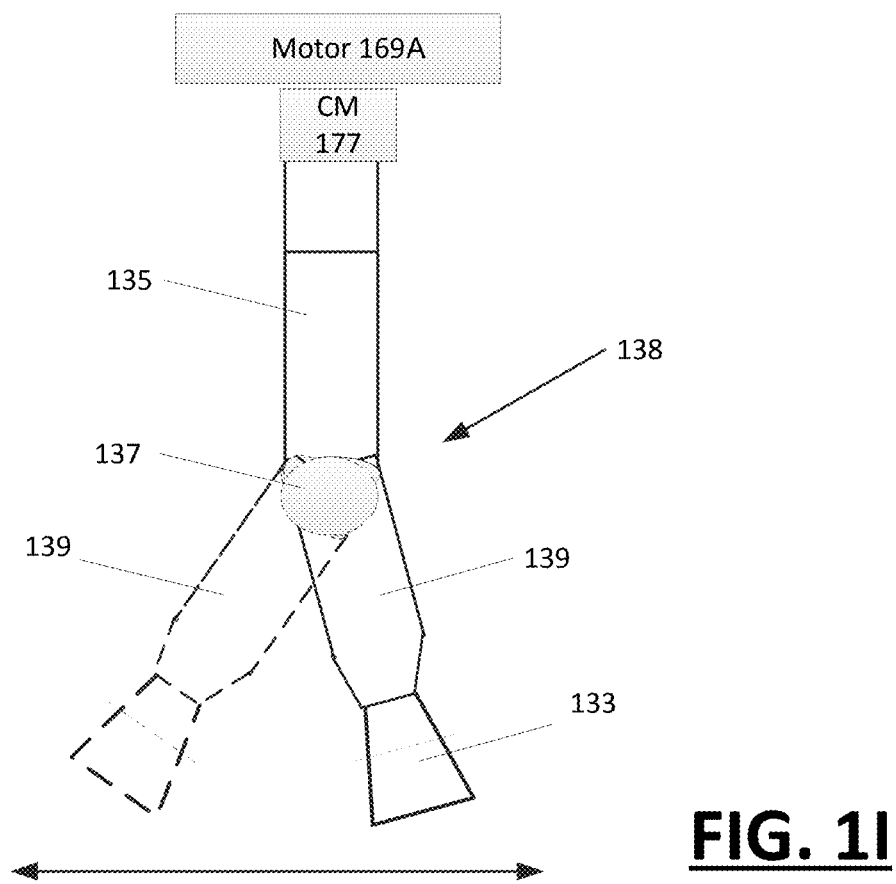
FIG. 1I illustrates a manipulator for food preparation device, according to an embodiment.

FIG. 1I illustrates the manipulator 138 for food preparation device 100, according to an embodiment. In more detail, manipulator 138 includes base segment 135, the joint 137, and one or more end segments 133. The end segment 133 can be detachable, so that different kinds of end segments 133 can be attached and incorporated into the manipulator 138.

The manipulator 138 is attached to the top segment 114 by a motor 149 and a connection mechanism 177. The base segment 135 can rotate horizontally, for example, in a 360 degree motion in conjunction with the control mechanism 177. The jointed food manipulator 138 can have multiple end segments 133, which can pivot about multiple joints 137 to provide a greater degree of motion within the receptacle 140. The joints 137 can each have an associated motor 149, which allows for locking actions of the joints 137 at specific angles to strengthen the ability of the jointed food manipulator 138 to manipulate the ingredients (e.g. cutting, scooping, flipping, pressing). The joints 137 and extensions may also consist of a spring 101 to prevent over exertion of force against the receptacle.

In one implementation, the end segment 133 can be in the form of a spatula, knife, or spoon, and selected by the user for a particular use. The manipulator 138 can position itself so that it can automatically attach and/or detach each end segment 133 through a twisting and locking motion. These attachments can be incorporated via slots that are readily accessible in base 112.

In operation, the manipulator 138 can be attached to motor 149, and further be provided with a connection mechanism 177 that enables movement of the base segment 135 in multiple degrees of freedom. For example, the combination of the connection mechanism 177 and the motor 149 can enable the base segment 135 to (i) translate in two lateral directions (X, Y) with respect to the receptacle 140, (ii) rotate about the connection mechanism 177, and/or (iii) adjust depth (Z) with respect to the receptacle 138. Additionally, the end segment 133 can pivot about the joint 137 to provide additional freedom of movement. In a variation, the manipulator 138 may also fold itself and retract to the top segment 114 while idle.

The specific type, intensity and degree of movement can be controlled by the processor 178 of the device 100. The user can interface with the processor 178 in order to specify a setting for the action that the manipulator 138 is to perform. In a variation, such as described with an example of FIG. 3, the processor 178 can implement recipe operations, and the setting of the manipulator 138 can be programmatically determined from the recipe.

Figure 1J:
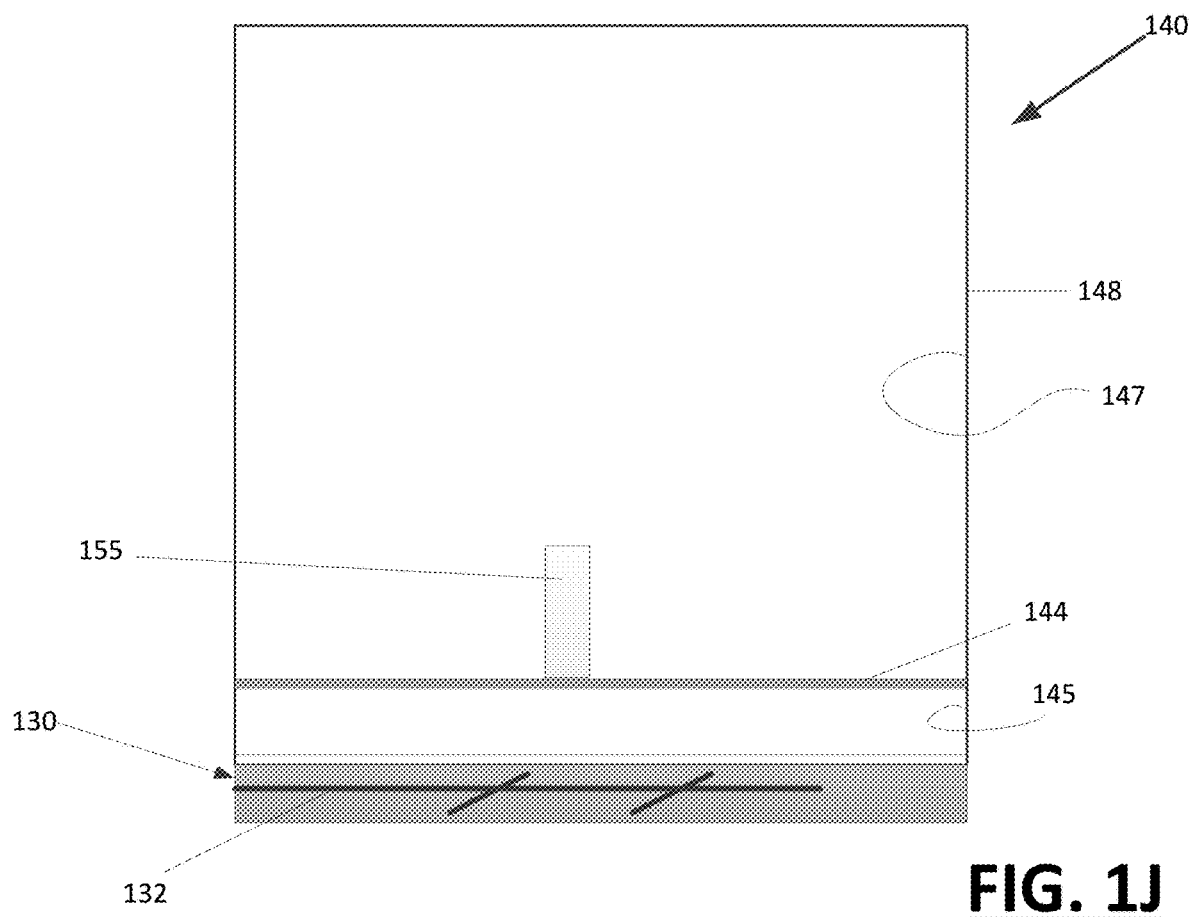
FIG. 1J illustrates a side view of receptacle without manipulator, according to an aspect.

FIG. 1J illustrates a side view of receptacle 140 without manipulator 138, according to an aspect. The receptacle 140 can include sidewalls 148 and the bottom cooking surface 144, which rests on bottom segment 130 and heater 132. Various features environments through the receptacle. For example, in one implementation, the receptacle 140 includes a steamer, having a reservoir 145 that heats and steams a cooking chamber 147. The sidewalls 148 can extend partially or completely to the top segment 114. The interior of the receptacle 140 can be segmented to include one or more barriers 155. The barrier 155 can be partial and separate cooking surfaces on the bottom of the receptacle. Alternatively, the barrier 155 can separate the interior of the receptacle 140 so as to provide different cooking environments (e.g., steamer and skillet). In some variations, the base 112 and/or receptacle 140 can include a lid (not shown) to enable pressurized cooking.

Figure 1K:
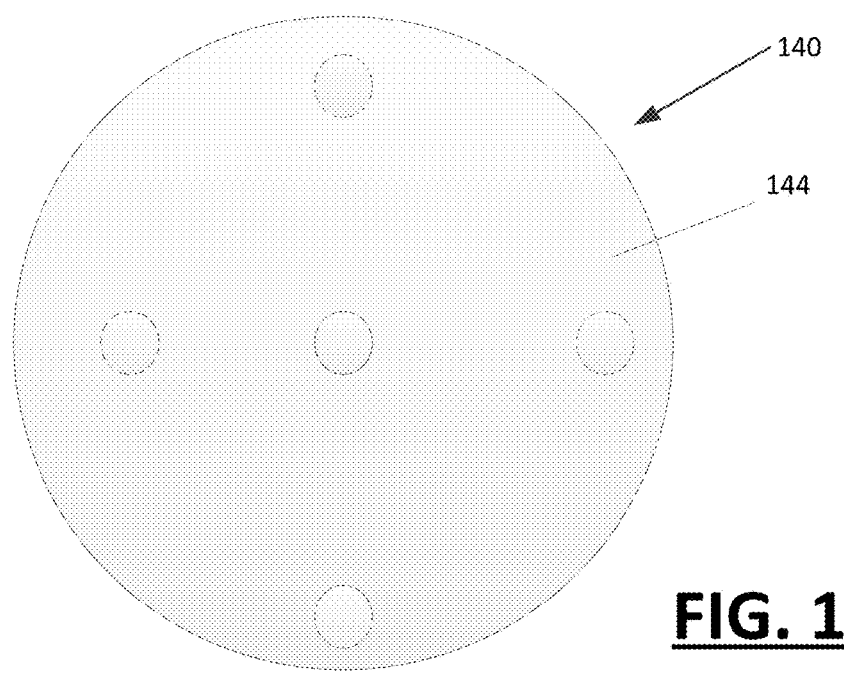
FIG. 1K illustrates a heating surface of the receptacle, according to an embodiment.

FIG. 1K illustrates heating surface 144 of the receptacle 140, according to an embodiment. In particular, FIG. 1K illustrates an area of coverage for manipulator 138, when operating within receptacle 140. As shown, the end segment 133 can operate to cover a substantial portion of the area of the receptacle 140. Among other benefits, the manipulator 138 can provide a thorough mixing, stirring, cutting, slicing, basting, or swirling motion (as determined by setting or selection) that engages food item in both center and corner regions of the receptacle 140.

In a variation, the heating surface 144 can be segmented to provide barriers for the preparation of combined food items. For example, some dishes can incorporate two items which require different cooking temperature or manipulation processes. Furthermore, the barriers can maintain separation of the food items as part of the preparation process. For example, raw meat can be separated from other foods that are being cooked at low temperatures.

With reference to examples above, the structure of the receptacle 140 can vary depending on design and implementation. The receptacle 140 can be provided with additional sidewall structures to enclose the container during the cooking process (e.g., prevent spillage when the food manipulator 138 operates). Still further, in some variations, a lid can optionally be provided to enable pressurized cooking.

Still further, in some variations, the heater 132 can be replaced with a cooler or chiller. For example, the bottom plate 130 can be replaced by a component that cools the temperature rather than heats the temperature. Still further, the receptacle itself can include additional structures that enable refrigeration or cooling.

Hardware Description

Figure 2:
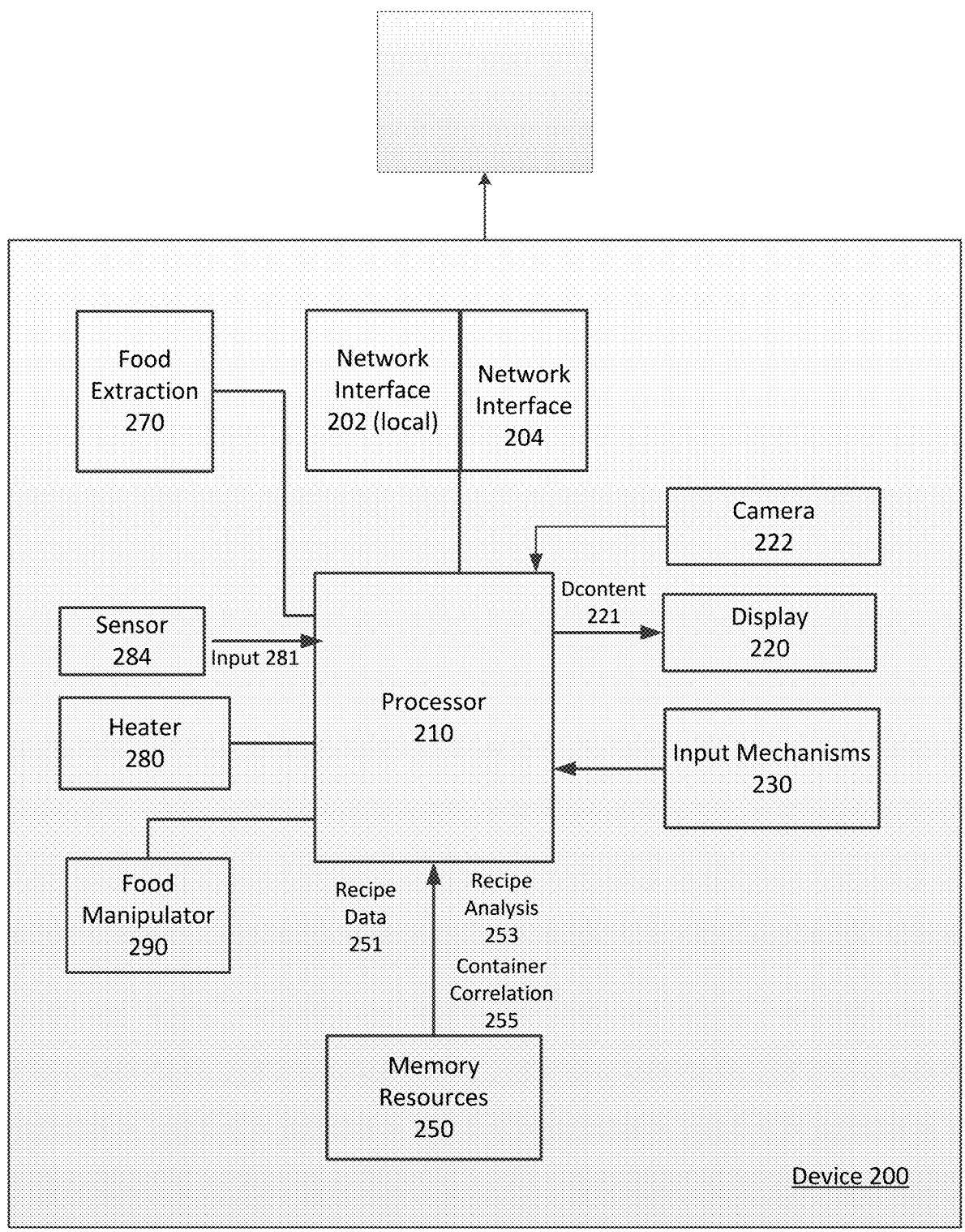
FIG. 2 illustrates a hardware diagram of a food preparation device, according to one or more embodiments.

FIG. 2 illustrates a hardware diagram of a food preparation device, according to one or more embodiments. In particular, a food preparation device 200 can optionally be implemented using, for example, structures and features such as shown with examples of FIG. 1A through FIG. 1B, and variations provided with FIG. 1C-FIG. 1E or FIG. 1F-FIG. 1G. With reference to FIG. 2, the food preparation system 200 includes a processor 210, a display 220, a set of input mechanisms 230, one or more wireless interfaces 202 (local), 204 (network), and memory resources 250. Additionally, the device 200 can include a food extraction mechanism 270, a heater 280, and a manipulator 290. In some variations, the device 200 includes a camera 222, such as a webcam, which communicates with the processor 210. As described below, the camera 222 can enable telecooking functionality, and or communicate images of the state of the food preparation device 100 to a remote user.

The display 220 can be implemented as, for example, a liquid crystal display ("LCD"), touch screen on the food preparation device 200. The processor 210 can communicate with the display 220 in order to provide feedback to the user, as well as to prompt the user for input. The feedback can include, for example, information that specifies what the processor 210 understands the user input to be, and/or specific information about the state of the device or its functions. Among other aspects, the processor 210 can output display content 221 through the display 220. By way of example, the display content 221 can identify what food item is being prepared, and/or a state of the food item including, for example, an amount of time remaining for the food item to be cooked, or steps that are yet to be performed before the food item can be prepared. In variations, the display output of the processor 210 can be communicated to another computer, such as a user tablet or laptop, via one of the network interfaces 202, 204.

The input mechanisms 230 can include, for example, a button, button set, or a touch screen or touch surface functionality. Additionally, various alternative forms of input mechanisms can be included with implementations described herein, including input mechanisms that provide a keyboard, voice input, or form of tactile/manual input (e.g. provide for more or less salt, how well-done meat should be).

The processor 210 can communicate with a network site or service using one or more wireless communication interfaces 202, 204. For example, the wireless communication interface 202, 204 can enable communications under one or more of 802.11(s), 802.11(b), 802.11(g) or 802.11(n) (collectively "Wi-Fi"), or through cellular transmissions. As an addition or alternative, the wireless communication interface 202 can enable a local wireless link, such as through a Bluetooth protocol to other devices (e.g., mobile devices operated by a user).

In operation, the processor 210 can control operation of components that comprise or correspond to the food extraction component 270, the heater 280, and/or the manipulator 290. In particular, the processor 210 can select the particular extraction component used to extract the food item from the food container 10. For example, with reference to FIG. 1D, the processor 210 can select whether the vacuum pump 166 is used to draw the food item out of the container 10, whether the injector 165 is used to push the food item out, or whether a combination of the vacuum or injector are used. Still further, the processor 210 can control an amount of food that is extracted from the container 10. The type of extraction used can be selected based on, for example, the contents of the food container 10 being extracted.

The heater 280 can be implemented as part of, for example, bottom plate 130. In one implementation, the heater 280 can be provided as an inductive or electrical heating surface that can heat the receptacle 140 to a suitable temperature to cook food such as meats or vegetables (e.g., 250-450 F). The processor 210 can control the temperature and duration in which the heater 280 is provided. In a variation, the processor 210 can control multiple heaters independently, so as to create different temperature environments within the receptacle. As feedback, the processor 210 can receive temperature input 281 from sensors 284 provided within the receptacle 140 (FIG. 1A-1B and FIG. 1C). In this way, the temperature sensors can provide feedback to the processor 210, and the processor 210 can use the feedback to regulate the heater 280.

The processor 210 can also control the manipulator 290. In some embodiments, the manipulator 290 can be implemented using the manipulator 138, manipulator motor 169A and connection mechanism 177, such as shown by an example of FIG. 1G. The control parameters that can be used for the manipulator 290 include one or more of (i) type of mixing (e.g., stirring, heavy mixing, swirling), (ii) degree of mixing (e.g., quick, slow, strong etc.), (iii) duration of mixing, (iv) time pattern for mixing (e.g., stir and pause, repeat), and/or (v) end segment 133 that is used during each time interval.

In controlling the food extraction mechanism 270, the heater 280 and/or the manipulator 290, the processor 210 can receive input from one or more of multiple sources. For example, the processor 210 can download a recipe from a network site using the network interface 202, receive the recipe from the user using the wireless device interface 204 (e.g., user uses mobile device and local network to wirelessly transmits the recipe to the food preparation device 200), or to an associated user device (e.g., laptop, via one of the interfaces). As described with examples of FIG. 3 through FIG. 6, the input can correspond to recipe input. The processor 210 can parse or otherwise analyze the recipe in order to determine information, including (i) which containers 10 of food items are needed to implement the recipe, (ii) specific times after commencement when each container 10 is added, (iii) temperature settings of the receptacle, which can be used to control the heater 280, and/or (iv) mixing settings, which can be used to control the manipulator 290.

The processor 210 can store recipes in the memory resources 250. Additionally, the memory resources 250 can store instructions and data ("recipe data 251") for correlating recipe information to parameters for using and controlling the device 200. In an embodiment, the memory resources 250 can store instructions for parsing recipes for food items and/or settings (e.g., temperature settings) ("recipe analysis 253"), and/or for correlating food items (e.g., butter, olive oil, chicken breast, rice etc.) to food containers 10 that supply specified food items or their equivalents ("container correlation 255"). By way of example, the memory resources 250 can store data that correlates "cut chicken breast" to a container that includes "chopped chicken," or "butter" to "olive oil". The processor 210 can use the data stored in the memory to identify what food containers 10 are needed for a particular recipe, and further to determine the settings of the heater 280 and/or manipulator 290 based on the specifications of the recipe.

Programmatic Architecture

Figure 3:
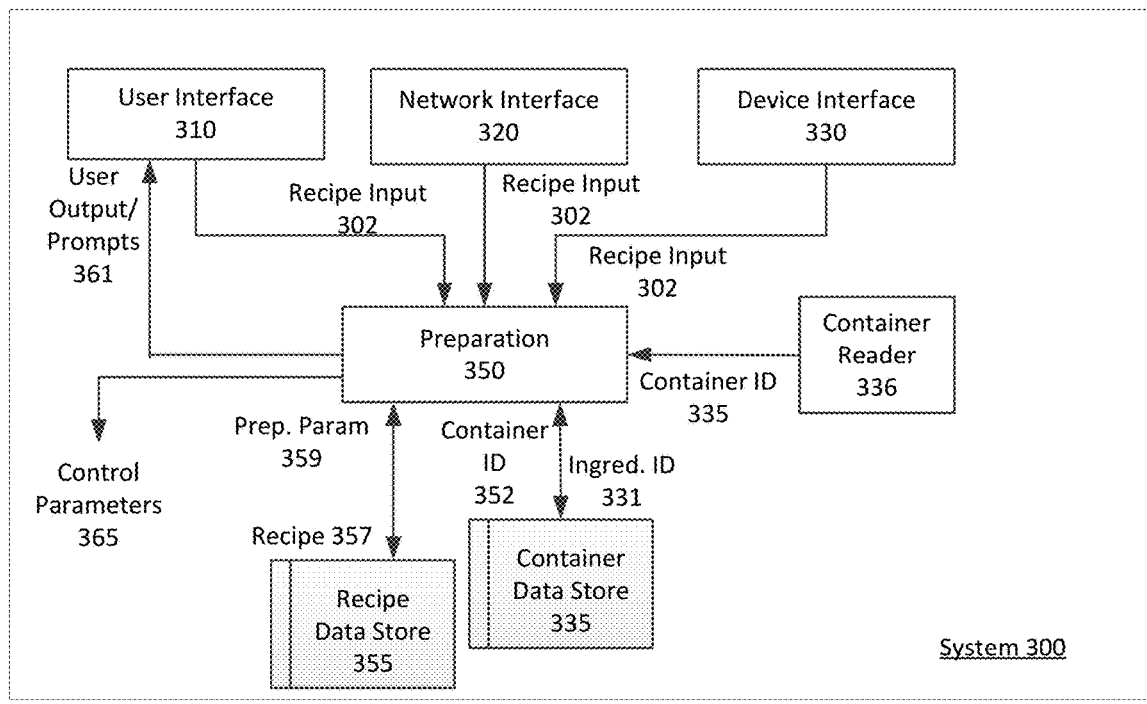
FIG. 3 illustrates a system for controlling and utilizing a food preparation system in conjunction with recipes of desired food items, according to one or more embodiments.

FIG. 3 illustrates a system for controlling and utilizing a food preparation system in conjunction with recipes of desired food items, according to one or more embodiments. A system 300 such as described with FIG. 3 can be implemented using a hardware system such as provided with an example of FIG. 2. Furthermore, system 300 can be implemented on the food preparation device such as shown and described with examples of FIG. 1A through FIG. 1I.

In more detail, system 300 includes a user interface 310, a network interface 320, one or more device interfaces 330 and a preparation module 350. The user interface 310 can include functional components that enable the user to provide input through the display 220 and/or input mechanisms 230. Alternatively, the user interface 210 can be generated and outputted by the processor 210 to an associated display device connected via, for example, a particular network interface 202, 204. In some implementations, the user interface 310 can include functionality in which the user is prompted to enter information, including recipe input 302, through for example, the display 220 (FIG. 2). The preparation module 350 can receive recipe input 302 from either of the user interface 310 (e.g., the user can manually enter a recipe), network interface 320 (e.g., system 300 can be triggered to download a recipe from a network site or service) and/or the device interface 330 (e.g., system 300 can communicate with the user device to receive some or all of the recipe).

Still further, preparation module 350 can have access to a recipe collection that is locally stored, such as for example, on the memory resources 250 (see FIG. 2). In such an implementation, the recipe input 302 can correspond to the user entering, through the user interface 310, a selection of a pre-stored recipe. Still further, the recipe input 302 can include input that the user enters to alter an existing recipe (e.g., a recipe that is pre-stored, or a recipe deadest downloaded from a network site). For example, the recipe input 302 can include the substitution or replacement of the recipe item (e.g., olive oil from butter).

The preparation module 350 can include logic to parse a recipe (as provided or specified with recipe input 302) for ingredients. The preparation module 350 can cross-reference a list of ingredients, including identifiers 331 for specific ingredients, with food containers 10 that include the same ingredients or their equivalents. In one embodiment, the preparation module 350 uses a container data store 335 in referencing the ingredient identifier 331 for a food container identifier 352.

Additionally, the preparation module 350 can determine, for a given recipe 357, preparation parameters 359 that are recommended or needed by the recipe 357. The preparation parameters can further be determined in the context of determined food containers 10. For example, recipe items may be referenced against predetermined preparation parameters for such items, and the preparation parameters can be provided in the context of the food containers 10. Thus, while the recipe may call for raw chicken to cook at 350° F., the recipe data store 355 can specify that to cook raw chicken, a corresponding raw chicken food container needs to be heated at 370° for a specified duration. Likewise, while the recipe may call for a cooked chicken, the identified food container 10 may correspond to a partially cooked chicken, or alternatively to a fully cooked chicken that is to be warmed. In such an instance, the recipe data store 355 can identify alternative cooking parameters 359 (temperature, heating) for the particular food container 10 (e.g., one with cooked chicken) that is to substitute for the recipe item. Furthermore, the recipe data store 355 can specify a sequence in which the food item of the identified food containers 10 are introduced into the cooking receptacle (e.g., see receptacle 140) of the food preparation device.

The preparation module 350 can also determine the sequence or order in which food containers 10 are introduced into the receptacle 140 (see FIG. 1A and FIG. 1B). For example, with reference to the food preparation device 100 of FIG. 1A and FIG. 1B, the opening of the base 112 (whether provided in top-down orientation, bottom-up orientation or other) can receive food containers 10 determined for a particular recipe in a particular order that dictates the sequence in which the food item of that container 10 is introduced into the receptacle 140. The preparation module 350 can communicate the sequencing or order of the individual food containers 10 to a user who places the food containers 10 in the opening 115. For example, the user interface 310 can be used to display an order for the placement of food containers 10 into the opening 115 of the housing 110. In some variations, the order or sequencing of the food items can also be altered from that specified by the recipe based on the variations provided by the determined food containers 10 for those food items. By way of example, if the recipe specifies for raw chicken that is introduced early into the food preparation process, the recipe data store 355 can specify that a food container 10 containing fully cooked chicken (as a determined substitute) is to be introduced into the cooking receptacle after all of the other food items of the recipe.

The preparation module 350 can include logic to verify that the user has properly inserted food containers 10 for a given recipe. The verification can include determining that the user has inserted containers 10 in the correct order. For example, in one implementation, logic corresponding to container reader 336 can be utilized with a camera or optical recognition component to read machine code or other identifier as provided on individual food containers 10 that are to be used for the given recipe. In a variation, the system 300 includes an RFID detector that detects and identifies an identifier/code of each food container 10. In still another variation, the preparation module 350 can have the user manually specify identifiers for individual food containers 10 of the recipe as a user places the containers 10 into the opening 115 of the housing 110. The preparation module 350 can verify, or check that the proper food containers 10 are being inserted into the opening 115 of the housing 110. Additionally, the preparation module 350 can verify that the ordering of the food containers 10 is correct given the requirements of the recipe and/or the food containers 10 being utilized.

The preparation module 350 can generate output for the user interface 310. In one embodiment, the output 361 can specify what food containers 10 the user will need in order to implement a specific recipe. The output 361 can also specify the order or sequence of the food containers 10, so as to prompt the user to position the food containers 10 in the correct order within the opening 115 of the base 112.

The preparation module 350 can also generate control parameters 365 for the use of the components needed to cook the food in the containers 10. Specific examples of control parameters include the temperature that the heater 280 is to rise to, as well as a duration for which that temperature is to be maintained. Examples contemplate that one recipe can utilize multiple temperatures, so that the cooking temperature (as maintained in the receptacle 140) may fluctuate by intent during the cooking process, and further different durations of heating may apply for different temperatures. As such, control parameters 365 can specify temperature, timing, and other parameters, such as the need for water or other liquids. The control parameters can be specific to components that include food extraction mechanism 270 (see FIG. 2), the heater 280 (see FIG. 2) and/or the manipulator 290 (see FIG. 2). The control parameters 365 (e.g., temperature, duration of heating) can also be determined from the rest of the recipe 357, such as provided by the recipe data store 355.

Figure 4:
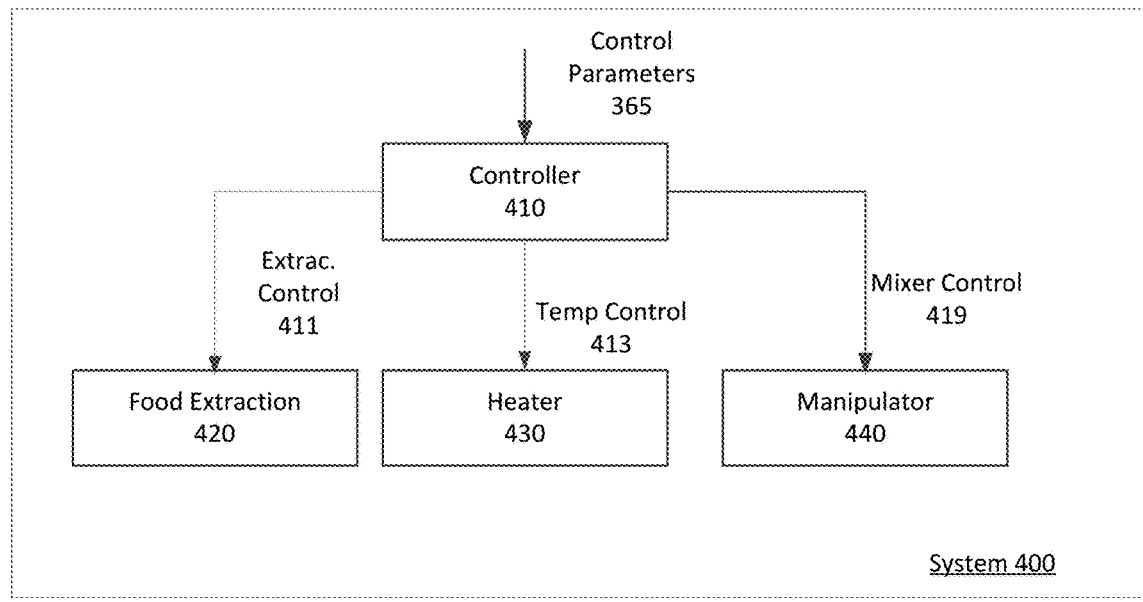
FIG. 4 illustrates a control system for a food preparation device, according to one or more embodiments.

FIG. 4 illustrates a control system for food preparation device, according to one or more embodiments. A system 400 such as described with an example of FIG. 4 can be implemented using a hardware system such as provided with FIG. 2. Furthermore, system 400 can be implemented on the food preparation device such as shown and described with FIG. 1A and FIG. 1B.

With reference to FIG. 4, a controller 410 can be implemented on the processor 210 in there is a controlled components that correspond to one or more of (i) food extraction mechanism 270 (see FIG. 2), (ii) heater 280 (see FIG. 2), and/or (iii) manipulator 290 (see FIG. 2). The system 400 can include logic for each of food extraction 420, heater 430, and manipulator 440. The food extraction logic 420 can include, for example, firmware, integrated circuits and/or programming (e.g. provided on the processor 210) to control operations of components that perform extraction (e.g., injector 165, vacuum pump 166 of FIG. 1). In an example provided by FIG. 4, control parameters 365 can be provided to the controller 410 from, for example, the preparation module 350. The control parameters 365 can specify parameters for extracting, heating and/or food items of the food container 10.

The controller 410 can signal extraction control 411 for the food extraction logic 420, which in turn controls the mechanical output of the food extraction mechanism 270 (e.g., injector 165, vacuum pump 166 of FIG. 1). The extraction control 411 can select which extraction mechanism is used (e.g. vacuum, injection, or tilting food container 10 at a specific angle). In variations, the extraction control 411 can also specify the magnitude of the extraction (e.g., extra vacuum for solid food), or other parameters (e.g., heat injection liquid).

As still another variation, the extraction control 411 can specify an amount of food item to be extracted. The determination of the amount that is to be extracted can be based on, for example, the recipe. For example, the food container 10 can retain two ounces of chopped tomatoes, and the recipe in use may call for one ounce of chopped tomatoes to be used. The extraction control 411 can specify that half of the food items are to be extracted. The user can then refrigerate or maintain the other half of the food container 10 for subsequent use.

The heater logic 430 can include, for example, firmware, integrated circuits and/or software (e.g., which can be provided on the processor 210) to control the operations of the heater 280. In an example described with FIG. 1A through FIG. 1H, the heater 280 can be implemented through the bottom plate 130, which engages and heats the receptacle 140. The controller 410 can signal temperature control 413 to the heater logic 430. In response to receiving temperature control 413, the heater logic 430 can manage the output of the heater 280. For example, in an implementation in which the heater 280 is an electrical heater, the heater logic 430 can increase/decrease current through a resistive element in order to increase or decrease the temperature of the heater 280. Additionally, the temperature control 413 can distinguish between different heating elements of the heater 280, so as to create different temperature environments.

Likewise, the manipulator control logic 440 include, for example, firmware, integrated circuits and/or software (e.g., which can be provided on the processor 210) to control the operations of the manipulator 290. In an example described with FIG. 1A and FIG. 1B, the manipulator 290 can be implemented by a member that extends from the top segment into the receptacle 140. The controller 410 can signal the manipulator control logic 440, a manipulator control 419 that specifies one or more of (i) type of mixing (e.g., stirring, heavy mixing, swirling), (ii) degree of mixing (e.g., quick, slow, strong etc.), (iii) duration of mixing, and/or (iv) time pattern for mixing (e.g., stir and pause, repeat).

While embodiments such as recited with FIG. 3 or FIG. 4 are recited in the context of a device such as shown with examples of FIG. 1A through FIG. 1L, in variations, other cooking systems or devices can be implemented. For example, a distributed system can be implemented with a conventional stove top. In such a system, a computer-implemented controller can operate on a motorized manipulator that is moved about a track on a stove top (or oven). A manipulator can be mounted above or to the side of a cooking surface (e.g., stove-top), and the manipulator can be controlled to change it's position using a motor controlled by the controller. In this way, the manipulator can lock into place above one burner, then move into place over another burner and maintain multiple cooking receptacles at one time. A user can upload recipes to the controller, which can operate similar to programming or logic described with examples of FIG. 3 or FIG. 4. The controller can in turn process the recipe and determine actions or movements for the manipulator. The controller can also provide information prompts or messages to a user in order to guide the user into preparing the meal. The controller can, for example, move between cooking surfaces and burners, using time intervals that are determined by the recipe. Actions such as stirring or blending can be programmatically implemented and repeated as needed. Still other actions such as waiting for cooling, or stirring until a certain consistency is reached, can also be performed. The combination of the controller, track system, and motorized manipulator can in this way provide a guided and assisted meal preparation experience for the user.

Methodology

Figure 5:
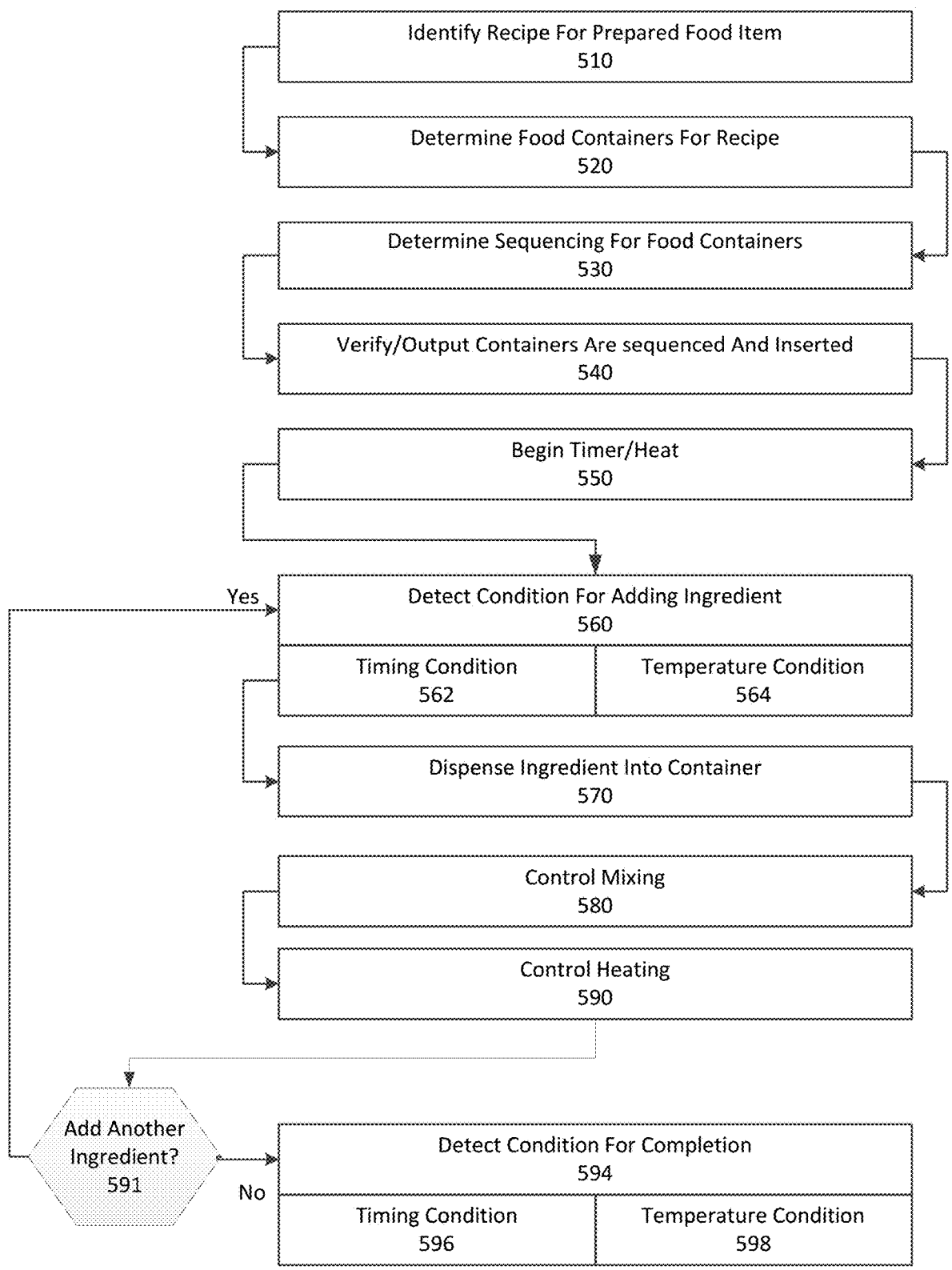
FIG. 5 illustrates a method for operating a food preparation device, according to one or more embodiments.

FIG. 5 illustrates a method for operating a food preparation device, according to one or more embodiments. In describing an example of FIG. 5, reference may be made to other examples, such as elements described with FIG. 2. Reference is made to elements of other examples for purpose of illustrating suitable elements or components for performing a step or sub-step being described.

With reference to FIG. 5, the food preparation device 200 identifies a recipe for a food item that is to be prepared (510). In one implementation, the device 200 utilizes the network interface 202 in order to access a network site and retrieve one or more recipes. For example, a user may control the device 200 and specify a network resource where a desired recipe is provided. Still further, the user can operate a separate computing device that can communicate with the food preparation device 200. The user can operate the computing device to signal a recipe to the food preparation device 200 via the wireless communication port 202. Still further, the user can specify a recipe stored in the memory resources 250 of the device, or provide recipe information 202 corresponding to a recipe or portion thereof through the input mechanisms 230.

The processor 210 can determine a set of food containers 10 that include food items specified in the recipe (520). For example, with reference to FIG. 2 and FIG. 3, the processor 210 can implement a preparation module 350 which parses recipes for food items, and correlates the food items to food containers based on a correlative data store (e.g., container data store 335 of FIG. 3).

In addition to determining food containers 10, the processor 210 can determine a sequencing or order for the food containers 10 (530). The sequence or order can determine the order in which the food containers 10 are placed in the housing 110 of the food preparation device. For example, with reference to FIG. 1C and FIG. 1D, the order or sequencing can determine the order in which food containers 10 are placed in the opening 115 of the housing 110.

In some embodiments, the device 200 includes resources for verifying the placement of food containers 10 within the opening 115 of the housing 110 (540). Additionally, the resources can verify the order or sequence of containers 10 provided in the housing 110. In one implementation, the device 200 can include a machine reader that detects a code on each food container 10. With further reference food preparation device 100, machine reader can verify the inclusion, and optionally the ordering of the food containers 10 in the opening 115 of the housing.

Once food containers 10 are provided within the device 200, the device 200 can begin food preparation (550). According to some embodiments, the device 200 starts the heater 280. The processor 210 can also initiate a timer for the heater. In some variations, the processor 210 can trigger the food extraction mechanism to extract food items from the food container and to disperse the food items into the receptacle 140 (see FIG. 1A through FIG. 1D).

Once cooking is initiated, the processor 210 performs steps to introduce food items into the receptacle 140. In particular, the processor 210 initiates operations to detect a condition for adding a food item into the receptacle 140 (560). The condition can include timing parameters (562). By way of example, the timing parameter can include a duration after heating occurs at a particular temperature, or alternatively, a sequencing condition (e.g., was another food item introduced into the receptacle as a pre-condition). As an alternative or variation, the condition can include a temperature condition (564). The temperature condition can identify whether the receptacle or heater 132 is at a pre-determined temperature before the food item is introduced (e.g., heat receptacle 140 to 335 F before introducing raw chicken).

Once the condition for adding a food item into the receptacle 140 is met, the processor 210 can trigger the food item to be extracted from the corresponding food container 10 and dispensed into the receptacle 140 (570).

Following dispensing of one or more food items, the processor 210 can control the manipulator 290 into mixing the receptacle of the food preparation device (580). The manipulating can specify a type of manipulating, a duration of manipulating, a range of manipulating and/or a timing pattern for the manipulating. After introduction of another ingredient, an embodiment provides that further manipulating (e.g., stirring) can be performed, based on control parameters etc. For example, a second ingredient (or second set of ingredients) can be provided by a food container 10 that is ordered to follow a first food container 10 that includes the first food item introduced in the receptacle 140.

The condition for introducing the second food container 10 can include (i) a timing parameter, corresponding to the pre-condition that the first food container 10 is dispensed; (ii) a heating/cooling condition, corresponding to the temperature of the receptacle 140 being raised to a particular temperature; and (iii) a timing parameter, corresponding to a duration of time during which the receptacle (140) (and food item from first container 10) is heated to the particular temperature.

Additionally, following dispensing of the food items, the heater 280 can be controlled by the processor 210 to achieve a particular temperature for cooking/warming contents of the receptacle 140 (590). In some implementations, the processor 210 can control the heater 280 into raising or lowering the temperature of the receptacle after introduction of a particular food item, or after passage of time. Thus, for example, the cooking process can include using multiple temperatures, which adjust or change after introduction of food items and/or passage of time.

A determination can be made as to whether additional ingredients are to be introduced (591). In one implementation, the determination can be made after each instance in which a food item is introduced into the receptacle 140. If another food item is to be extracted and introduced into the receptacle 140, then the method repeats at (560). Else the processor 210 detects a condition for completion of the cooking process (594). The condition for completion of the cooking process can include a timing condition (596). For example, the cooking process continues for ten minutes after the last ingredient is introduced. The condition for completion of the cooking process can alternatively include a temperature condition (598). For example, the cooking process can end when the temperature of an item is deemed to reach a certain level.

Figure 6:
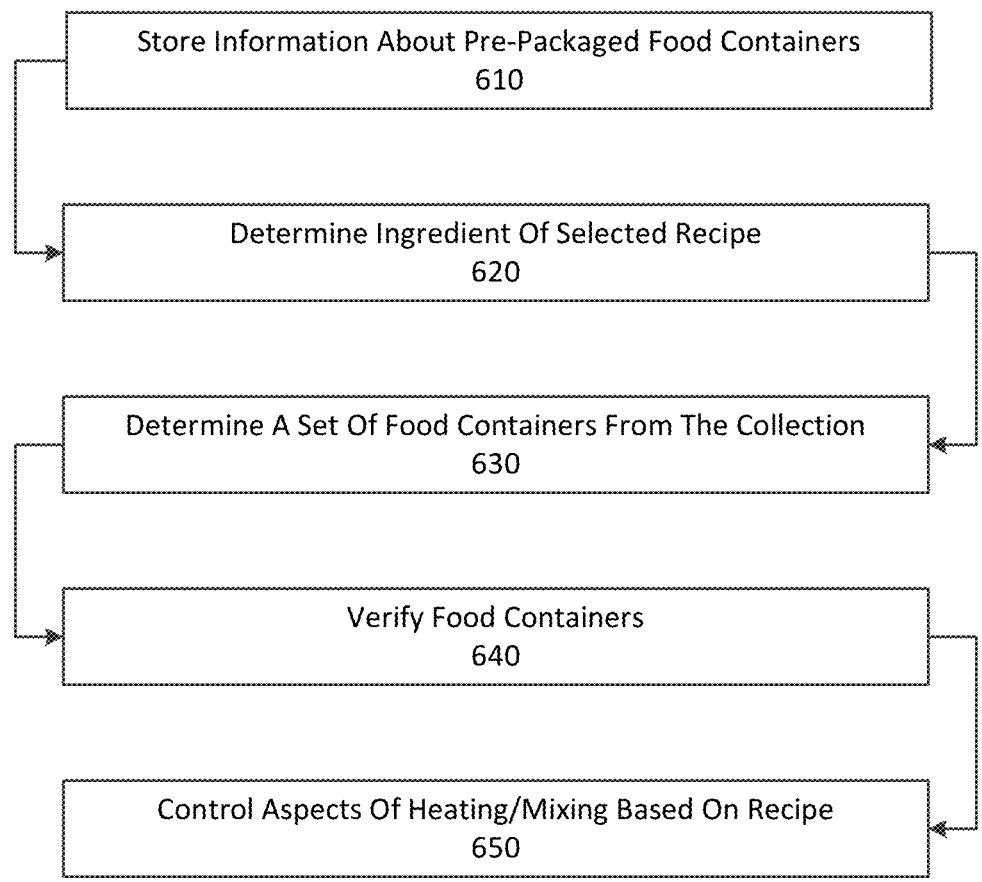
FIG. 6 illustrates a method for utilizing a food preparation device and pre-packaged food containers to implement a recipe, according to one or more embodiments.

FIG. 6 illustrates a method for utilizing a food preparation device and pre-packaged food containers to implement a recipe, according to one or more embodiments. A method such as describe with an example of FIG. 6 can be implemented using a device such as described with FIG. 2, and further a system such as described with FIG. 3. Accordingly, reference may be made to elements of FIG. 2 and FIG. 3 for purpose of illustrating suitable components or elements for performing a step or sub-step being described.

In an embodiment, information about a collection of pre-packaged food containers 10 is stored with memory resources 250 of the food preparation device (610). Alternatively, the information can be stored remotely and provided as, for example, a service in conjunction with use of a food preparation device. The information about the collection of pre-packaged containers 10 can include information about individual food items contained in each container 10 of the plurality of pre-packaged containers 10.

The ingredients of a selected recipe can be determined (620). In one implementation, the processor 210 implements logic (e.g., using instructions stored in memory resources 250) to determine the ingredients of a particular recipe. In a variation, the logic can be provided remotely to the food preparation device 200, and the results determined from implementing the logic can be communicated to the food preparation device 200.

In an embodiment, the processor 210 determines a set of containers 10 from the collection of pre-packaged containers (630). The set of containers 10 are selected as for providing the ingredients for a prepared food item of the recipe. The set of food items can be determined based at least in part on comparing the food items of the set of containers 10 with ingredients specified in the recipe.

Still further, in an embodiment, the processor 210 can perform a verification to confirm that each container 10 in the set of containers 10 is received in a food preparation device (640). For example, the processor 210 can control a machine reader to detect a machine-readable code on the individual food containers 10 in the set of food containers 10. Alternatively, the processor 210 can prompt the user to enter or otherwise specify information confirming that each container 10 in the set has been provided with food preparation device 100.

Additionally, the processor 210 can control one or more aspects of heating or mixing the food items provided from the set of containers based on the recipe (650). For example, the processor 210 can determine the control parameters 365, which control heating, manipulating (and optionally food extraction).

Additional Usages

In one aspect, the combination of the camera 222, processor 210 and network interface 202, 204 can enable a remote food preparation use ("telecooking"). For example, a remotely located user can conduct live telecooking, during which the remotely located user controls the operation of the food preparation device 100. By way of example, the remotely located user can conduct live cooking sessions which stream directly to the local machine. A remote user can upload a recipe and also adjusts the recipe as is necessary or desired. The operation of the food preparation device 100 can optionally be triggered remotely. For example, a mother can telecook and proctor her college-aged child on how to cook stir-fried tomato and eggs. The remote user (e.g., mother) can proctor the local user (e.g., her child) during the cooking process using a laptop or tablet device. Functions such as timing, recipe selection, prompts regarding the addition of ingredients, and/or temperature settings can be provided from the remote user. The food preparation device 100 can also provide prompts, generated through recipe processing or remote user input, to instruct the local operator to perform certain actions.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating a food preparation device, the food preparation device including a processor, a memory, a network interface, and a camera that is in communication with the processor, the method comprising:
   storing, locally in the memory of the food preparation device, information about a collection of pre-packaged containers, each container of the collection of pre-packaged containers including one or more food items and a machine-readable code that identifies the one or more food items;
   receiving, by the processor of the food preparation device, a set of instructions from a user device to prepare a dish, the set of instructions identifying a recipe, and the recipe identifying ingredients;
   determining, by the processor, a set of containers from the collection of pre-packaged containers, the set of containers selected to provide the ingredients identified by the recipe;
   receiving, in a base of the food preparation device, the set of containers, wherein each container in the set is received individually in an order;
   reading, by a machine reader of the food preparation device, the machine-readable code provided on each of the received containers;
   verifying, by the processor, based on the stored information and the machine-readable code provided on each of the received containers, (i) that the set of received containers includes the ingredients identified by the recipe, and (ii) that the order in which the containers of the set are individually received in the base corresponds to a sequence in which the one or more food items in each of the received containers are to be introduced into a cooking receptacle during preparation of the dish according to the recipe;
   controlling, by the processor, a track member of the food preparation device to move each of the received containers vertically from the base to a position above the cooking receptacle for engagement by an extraction mechanism;
   extracting, by the extraction mechanism, the one or more food items from each of the received containers into the cooking receptacle;
   controlling, by the processor, a motorized movement of a manipulator to manipulate the extracted food items based on the recipe, the motorized movement having characteristics of a type of mixing, a duration, and a range of movement;
   while controlling the motorized movement of the manipulator, controlling a temperature of the cooking receptacle to cook the extracted food items based on the recipe;
   transmitting, by the camera in communication with the processor and over the network interface, image data of the food preparation device; and
   based on the image data, transmitting, to a mobile device, display content, wherein the display content identifies information about the food items that are being cooked and manipulated.

2. The method of claim 1, wherein the set of instructions further include instructions to modify the recipe.

3. The method of claim 1, wherein controlling the temperature of the cooking receptacle further comprises:
   controlling a duration during which the extracted food items are cooked in the cooking receptacle based on the recipe.

4. The method of claim 1, wherein the display content identifies an amount of time remaining for the extracted food items to be cooked.

5. The method of claim 1, wherein the display content identifies steps that are yet to be performed before the extracted food items are prepared.

6. The method of claim 1, wherein the manipulator is a jointed food manipulator.

* * * * *